(12) United States Patent
Surnilla et al.

(10) Patent No.: US 7,114,325 B2
(45) Date of Patent: Oct. 3, 2006

(54) CONTROL SYSTEM WITH A SENSOR

(75) Inventors: Gopichandra Surnilla, West Bloomfield, MI (US); Richard E. Soltis, Saline, MI (US); Jacobus H. Visser, Farmington Hills, MI (US); Joseph Thomas, Dearborn, MI (US); David Kubinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 10/898,641

(22) Filed: Jul. 23, 2004

(65) Prior Publication Data

US 2006/0016174 A1    Jan. 26, 2006

(51) Int. Cl.
*F01N 3/00* (2006.01)

(52) U.S. Cl. ............... 60/276; 60/274; 60/277; 60/285; 73/118.1; 73/31.02; 73/31.05; 73/23.21; 73/23.32; 204/406; 204/424; 205/781

(58) Field of Classification Search ........... 60/274, 60/276, 285, 286; 73/118.1, 31.01, 31.02, 73/31.05, 23.2, 23.21, 23.31, 23.32; 204/406, 204/410, 421, 424, 425; 205/781, 784, 786.5, 205/788
See application file for complete search history.

(56) References Cited

U.S. PATENT DOCUMENTS

| | | | |
|---|---|---|---|
| 6,036,842 A | 3/2000 | Kato et al. | |
| 6,044,689 A | 4/2000 | Yoshida et al. | |
| 6,062,064 A | 5/2000 | Yoshida et al. | |
| 6,071,393 A | 6/2000 | Oshima et al. | |
| 6,071,554 A | 6/2000 | Isomura et al. | |
| 6,076,393 A | 6/2000 | Kato et al. | |
| 6,082,175 A | 7/2000 | Yoshikawa | |
| 6,082,176 A | 7/2000 | Kondo et al. | |
| 6,083,370 A * | 7/2000 | Kato et al. | 204/425 |
| 6,093,294 A | 7/2000 | Kato et al. | |
| 6,134,883 A | 10/2000 | Kato et al. | |
| 6,136,170 A | 10/2000 | Inoue et al. | |
| 6,156,175 A | 12/2000 | Kato et al. | |
| 6,196,053 B1 | 3/2001 | Kato et al. | |
| 6,214,207 B1 | 4/2001 | Miyata et al. | |
| 6,224,727 B1 | 5/2001 | Miyata et al. | |
| 6,228,252 B1 | 5/2001 | Miyata et al. | |
| 6,280,588 B1 | 8/2001 | Kato et al. | |
| 6,284,112 B1 | 9/2001 | Kato et al. | |
| 6,287,439 B1 | 9/2001 | Kato et al. | |
| 6,290,840 B1 | 9/2001 | Kato et al. | |
| 6,295,862 B1 * | 10/2001 | Kurokawa et al. | 73/31.05 |
| 6,296,748 B1 | 10/2001 | Ohtsuki et al. | |
| 6,306,271 B1 | 10/2001 | Kato et al. | |
| 6,309,536 B1 * | 10/2001 | Inagaki et al. | 205/781 |
| 6,311,543 B1 | 11/2001 | Yoshikawa et al. | |
| 6,327,847 B1 | 12/2001 | Surnilla et al. | |
| 6,327,891 B1 | 12/2001 | Noda et al. | |
| 6,344,119 B1 | 2/2002 | Kato et al. | |

(Continued)

*Primary Examiner*—Binh Q. Tran
(74) *Attorney, Agent, or Firm*—Allan J. Lippa; Alleman Hall McCoy Russell & Tuttle LLP (57) ABSTRACT

An improved engine control system using a NOx sensor is disclosed. In one example, the NOx sensor structure and/or signals are modified to improve distance transmission of NOx sensor output signals so that at least some processing electronics can be relocated remote to the sensor and in an engine control unit, or other such control unit utilizing the NOx sensor signals, and controlling the NOx sensor heaters, if applicable.

34 Claims, 6 Drawing Sheets

U.S. PATENT DOCUMENTS

| | | |
|---|---|---|
| 6,344,134 B1 | 2/2002 | Yamada et al. |
| 6,348,140 B1 | 2/2002 | Matsubara et al. |
| 6,348,141 B1 | 2/2002 | Kato |
| 6,352,632 B1 | 3/2002 | Inagaki et al. |
| 6,355,152 B1 | 3/2002 | Kato et al. |
| 6,360,581 B1 | 3/2002 | Murase et al. |
| 6,375,828 B1 | 4/2002 | Ando et al. |
| 6,427,437 B1 | 8/2002 | Bidner et al. |
| 6,442,998 B1 * | 9/2002 | Kurokawa et al. ......... 73/31.05 |
| 6,455,009 B1 | 9/2002 | Kato et al. |
| 6,477,832 B1 | 11/2002 | Surnilla et al. |
| 6,481,199 B1 | 11/2002 | Bidner et al. |
| 6,487,850 B1 | 12/2002 | Bidner et al. |
| 6,500,322 B1 | 12/2002 | Akatsuka et al. |
| 6,527,929 B1 | 3/2003 | Kato et al. |
| 6,532,732 B1 | 3/2003 | Surnilla et al. |
| 6,533,921 B1 | 3/2003 | Miyata et al. |
| 6,539,704 B1 | 4/2003 | Surnilla et al. |
| 6,547,955 B1 * | 4/2003 | Hada et al. .................. 205/781 |
| 6,548,023 B1 | 4/2003 | Matsuo et al. |
| 6,594,985 B1 * | 7/2003 | Surnilla et al. ................ 60/277 |
| 6,594,989 B1 | 7/2003 | Hepburn et al. |
| 6,623,617 B1 | 9/2003 | Ando |
| 6,623,618 B1 | 9/2003 | Kato et al. |
| 6,635,161 B1 | 10/2003 | Inagaki |
| 6,635,162 B1 | 10/2003 | Sugaya et al. |
| 6,676,817 B1 | 1/2004 | Noda et al. |
| 6,682,639 B1 | 1/2004 | Atsumi et al. |
| 6,689,266 B1 | 2/2004 | Kato et al. |
| 6,695,964 B1 | 2/2004 | Ando et al. |
| 6,726,819 B1 | 4/2004 | Atsumi et al. |
| 6,743,352 B1 | 6/2004 | Ando et al. |
| 6,758,952 B1 | 7/2004 | Ishikawa |

\* cited by examiner

CONTROL SYSTEM WITH A SENSOR

BACKGROUND AND SUMMARY

Various types of NOx sensors have been proposed for use in engine control to improve performance and reduce emissions. In one example, an electronically heated dual pumping cell (chamber) type sensor is used that provides both oxygen concentration and NOx concentration.

In general, a first voltage is applied across the first pumping cell which results in oxygen being pumped out of a first chamber. The first chamber may be connected to the ambient measurement gas through an aperture or porous diffusion barrier. Once all of the oxygen has been removed from the chamber, the pumping current saturates at a level proportional to the rate of oxygen diffusing into the first chamber. The limiting current from the first cell can be a measure of the oxygen concentration in the measurement gas and can be proportional to air/fuel ratio. The pumping current from this first cell may be on the order of milliamps in engine exhaust applications.

The second pumping cell in the sensor dissociates the NOx and pumps out the oxygen liberated from the dissociation. The pumping current output from the second cell can be a measure of the NOx concentration. This second pump cell may be located in a second chamber adjacent to the first chamber and connected by another aperture or porous diffusion barrier. However, because in engine exhaust application NOx concentrations may be significantly lower than oxygen concentrations, and because NOx must diffuse through 2 separate diffusion barriers, the oxygen pumped by the second cell from the dissociation of NOx may be very small. Therefore, the resulting limiting pumping current may also be very small (on the order of nanoamps), as compared to the milliamps arising from the first cell.

In prior approaches, such as U.S. Pat. No. 6,309,536, separate electronic processing (including A/D converters) from the engine control unit has been used to provide accurate sensing of both oxygen and NOx. It is presumed that such redundant processing is needed in close proximity to the sensor to process the pump currents and control the heater. In other words, long signal wires between the sensor and electronics may result in loss of signal and increased noise. Thus, the small pumping current may limit the distance between the signal processing electronics and the sensor (thereby resulting in multiple processing units), and may also require fairly sophisticated ammeters to accurately measure the signal.

The inventors herein have recognized a disadvantage with such an approach. In particular, providing separate processing electronics, especially in close proximity to the sensor, may create numerous issues. First, cost is significantly increased due to the electronics, and cost is further increased due to the harsh exhaust environment that these electronics must endure.

The above issues may be addressed by, a system for a vehicle having an internal combustion engine, the system comprising:

a sensor adapted to be coupled into an exhaust of the engine, said sensor outputting at least a first signal indicative of oxygen and a second signal indicative of NOx;

a controller receiving at least said first and second signal, said controller processing said first and second signal, and controlling said engine by adjusting an engine actuator based on at least one of said first and second processed signals; and a transmission amplifier coupled to said sensor configured to amplify said second signal before it is transmitted to and received by said controller.

In another embodiment, the above issues may be addressed by a system for a vehicle having an internal combustion engine, the system comprising:

a sensor adapted to be coupled into an exhaust of the engine, where exhaust gas enters at least a first pumping cell that outputs at least a first signal indicative of oxygen, and then enters a second pumping cell through an passage, the second cell outputs at least a second signal indicative of NOx, and the passage configured to produce said second signal such that it can be transmitted to a controller;

said controller receiving at least said first and second signal, said controller processing said first and second signal, and controlling said engine by adjusting an engine actuator based on at least one of said first and second processed signals.

As such, the inventors herein have recognized that the NOx signal current levels are driving the use of a processor and other electronics close to the sensor. Further, they have also recognized that only the NOx signal generally is of low pumping current levels. Thus, in one example, the current forming the NOx signal is amplified such that wiring losses are reduced and the processing electronics, including the NOx and oxygen signal and heater control electronics can be moved to the engine control unit. In another example, a NOx sensor structure is provided to increase current forming the NOx signal such that wiring losses are reduced and the processing electronics, including the NOx and oxygen signal and heater control electronics can be moved to the engine control unit. These embodiments may also be used in combination, if desired.

Note that there are various types of transmission amplifiers, and various types of NOx sensors that provide at least a first and second output. Further, while the above example relates to NOx sensing, the approach can be applied to any oxygen containing species, such as SOx, CO2, and/or H2O, for example.

BRIEF DESCRIPTION OF THE FIGURES

The above features and advantages will be readily apparent from the following detailed description of example embodiment(s). Further, these features and advantages will also be apparent from the following drawings.

DETAILED DESCRIPTION OF EXAMPLE EMBODIMENT(S)

Figure 1:
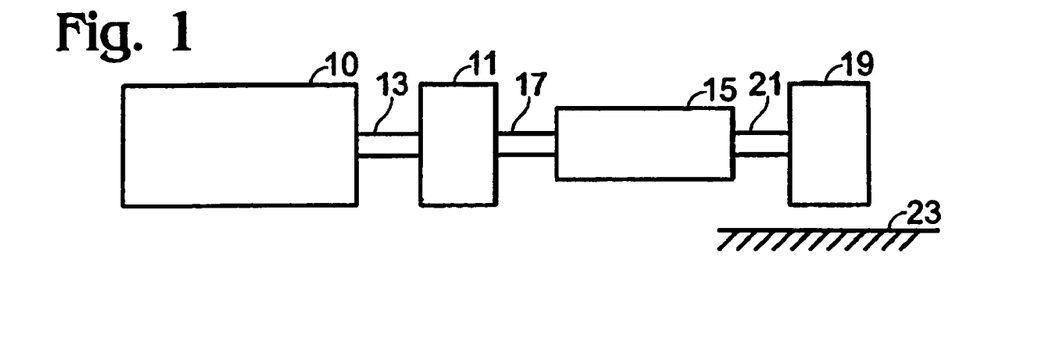
FIG. 1 is a block diagram of a vehicle illustrating various components of the powertrain system.
Figure 1A:
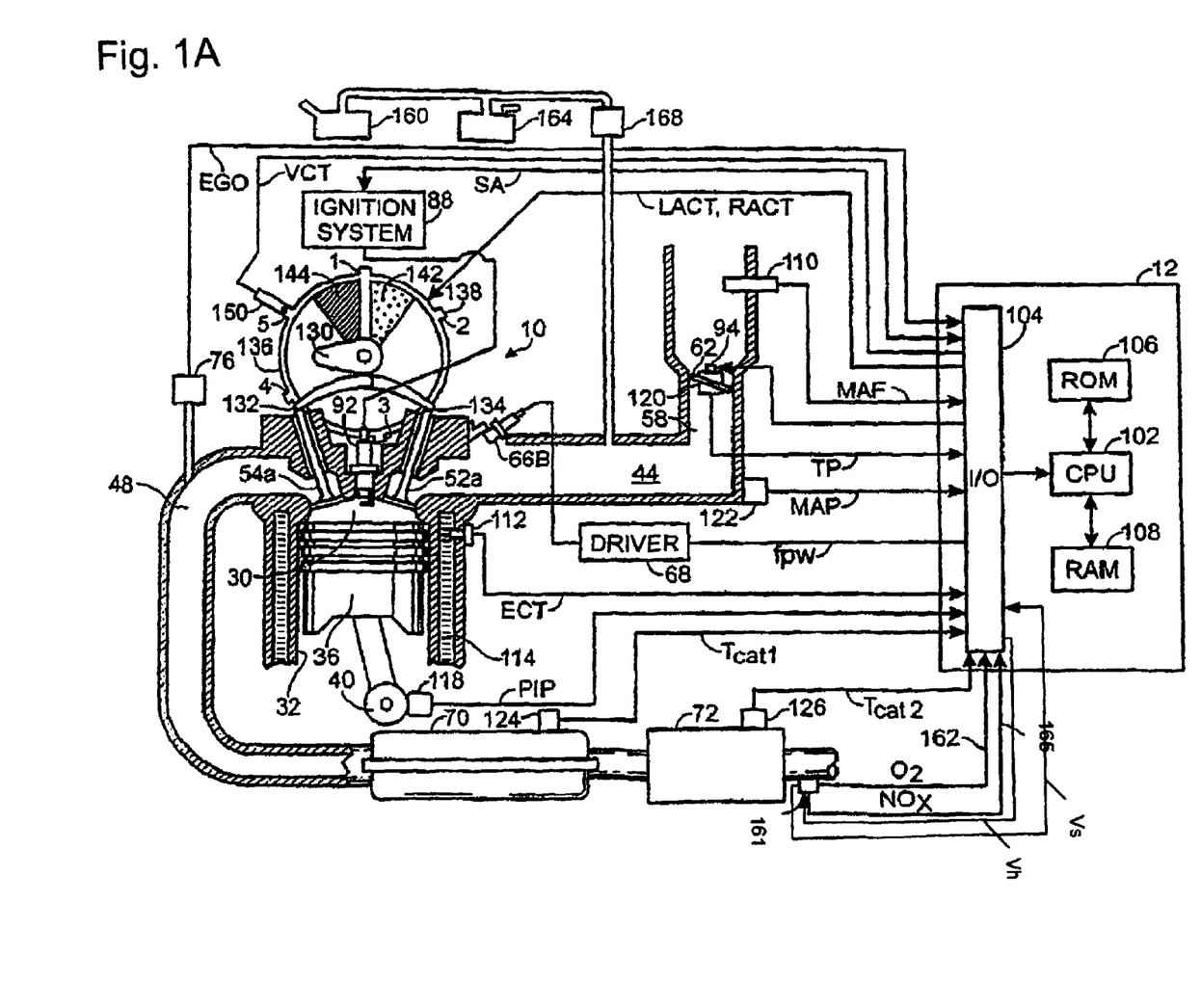
FIGS. 1A and 1B show a partial engine view.
Figure 1B:
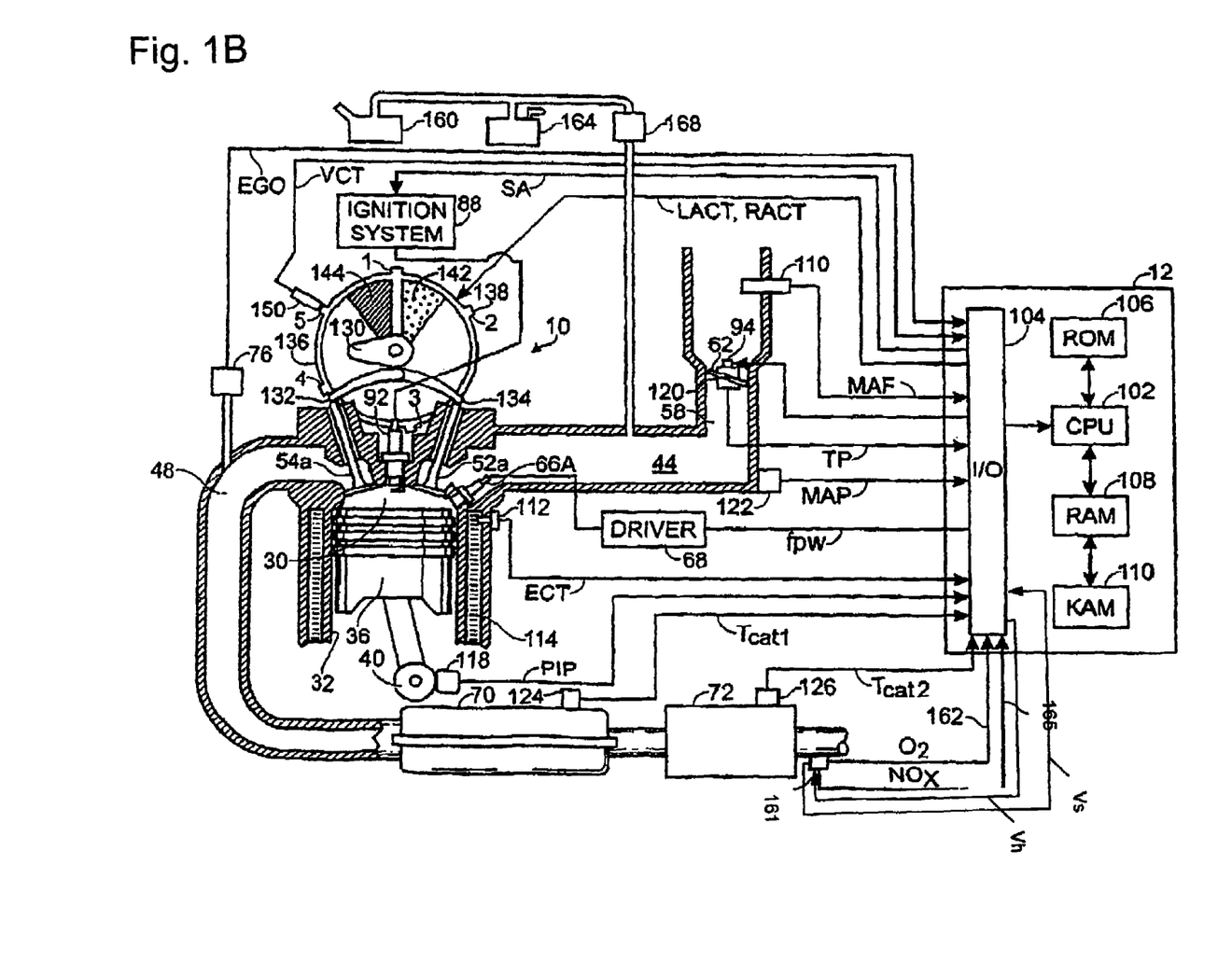

Referring to FIG. 1, internal combustion engine 10, further described herein with particular reference to FIGS. 1A and 1B, is shown coupled to torque converter 11 via crankshaft 13. Torque converter 11 is also coupled to transmission 15 via turbine shaft 17. Torque converter 11 has a bypass, or lock-up clutch 14 which can be engaged, disengaged, or partially engaged. When the clutch is either disengaged or partially engaged, the torque converter is said to be in an unlocked state. The lock-up clutch 14 can be actuated electrically, hydraulically, or electro-hydraulically, for example. The lock-up clutch 14 receives a control signal (not shown) from the controller, described in more detail below. The control signal may be a pulse width modulated signal to engage, partially engage, and disengage, the clutch based on engine, vehicle, and/or transmission operating conditions. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23. Note that in one example embodiment, this powertrain is coupled in a passenger vehicle that travels on the road.

FIGS. 1A and 1B show one cylinder of a multi-cylinder engine, as well as the intake and exhaust path connected to that cylinder. This can be a cylinder of various different engine configurations, including a v-type, inline, opposed, or other such engine type.

Continuing with FIG. 1A, direct injection spark ignited internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) is coupled to crankshaft 40 via a flywheel (not shown). In this particular example, piston 36 includes a recess or bowl (not shown) to help in forming stratified charges of air and fuel. Combustion chamber, or cylinder, 30 is shown communicating with intake manifold 44 and exhaust manifold 48 via respective intake valves 52a and 52b (not shown), and exhaust valves 54a and 54b (not shown). Fuel injector 66A is shown directly coupled to combustion chamber 30 for delivering injected fuel directly therein in proportion to the pulse width of signal fpw received from controller 12 via conventional electronic driver 68. Fuel is delivered to fuel injector 66A by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70 (note that sensor 76 corresponds to various different sensors, depending on the exhaust configuration). Sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66A during the engine compression stroke so that fuel is sprayed directly into the bowl of piston 36. Stratified air/fuel layers are thereby formed. The strata closest to the spark plug contain a stoichiometric mixture or a mixture slightly rich of stoichiometry, and subsequent strata contain progressively leaner mixtures. During the homogeneous mode, controller 12 activates fuel injector 66A during the intake stroke so that a substantially homogeneous air/fuel mixture is formed when ignition power is supplied to spark plug 92 by ignition system 88. Controller 12 controls the amount of fuel delivered by fuel injector 66A so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is also possible.

Nitrogen oxide (NOx) adsorbent or trap 72 is shown positioned downstream of catalytic converter 70. NOx trap 72 is a three-way catalyst that adsorbs NOx when engine 10 is operating lean of stoichiometry. The adsorbed NOx is subsequently reacted with HC and CO and catalyzed when controller 12 causes engine 10 to operate in either a rich homogeneous mode or a near stoichiometric homogeneous mode such operation occurs during a NOx purge cycle when it is desired to purge stored NOx from NOx trap 72, or during a vapor purge cycle to recover fuel vapors from fuel tank 160 and fuel vapor storage canister 164 via purge control valve 168, or during operating modes requiring more engine power, or during operation modes regulating temperature of the omission control devices such as catalyst 70 or NOx trap 72.

Controller 12 is shown in FIG. 1A as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give and indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

In this particular example, temperature Tcat1 of catalytic converter 70 and temperature Tcat2 of emission control device 72 (which can be a NOx trap) are inferred from engine operation as disclosed in U.S. Pat. No. 5,414,994, the specification of which is incorporated herein by reference. In an alternate embodiment, temperature Tcat1 is provided by temperature sensor 124 and temperature Tcat2 is provided by temperature sensor 126.

Continuing with FIG. 1A, camshaft 130 of engine 10 is shown communicating with rocker arms 132 and 134 for actuating intake valves 52a, 52b and exhaust valve 54a. 54b. Camshaft 130 is directly coupled to housing 136. Housing 136 forms a toothed wheel having a plurality of teeth 138. Housing 136 is hydraulically coupled to an inner shaft (not shown), which is in turn directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing is measured using the method described in U.S. Pat. No. 5,548,995, which is incorporated herein by reference. In general terms, the time, or rotation angle between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 161 provides an indication of both oxygen concentration in the exhaust gas as well as NOx concentration. Signal 162 provides controller a voltage indicative of the O2 concentration while signal 165 provides a voltage indicative of NOx concentration. Alternatively, sensor 161 can be a HEGO, UEGO, EGO, or other type of exhaust gas sensor. While FIG. 1A (and 1B) shows sensor 161 coupled downstream of a downstream emission control device, sensor 161 can be in various other exhaust locations. As one example, sensor 161 can be placed in the exhaust manifold upstream of emission control device 70, or between devices 70 and 72. As another example, sensor 161 can be located within device 172, such as in the downstream half of the device, within a brick, or between bricks within device 72. Likewise, it can be located within device 70. Some of these options, and other options, are described in more detail below with regard to FIG. 4. Also note that sensor 161, along with controller 12, are described in more detail below with regard to FIGS. 2–3.

As described above, FIG. 1A (and 1B) merely show one cylinder of a multi-cylinder engine, and that each cylinder has its own set of intake/exhaust valves, fuel injectors, spark plugs, etc.

Referring now to FIG. 1B, a port fuel injection configuration is shown where fuel injector 66B is coupled to intake manifold 44, rather than directly cylinder 30.

While FIGS. 1A and 1B show a gasoline spark ignition engine, in an alternative embodiment the engine may be a diesel, or other compression ignition engine. In this case, either or both of devices 70 and 72 may be various other emission control devices, such an oxidation catalyst, a particulate filter, a selective catalytic reduction (SCR) catalyst. Further, late injection in the direction injection embodiment may be used to supply reductant to the exhaust. Alternatively, or in addition, a separate reductant injection system may be used to inject reductant into the exhaust. The reductant may be diesel fuel or other hydrocarbons, or ammonia, or urea.

Also, in the example embodiments described herein, the engine is coupled to a starter motor (not shown) for starting the engine. The starter motor is powered when the driver turns a key in the ignition switch on the steering column, for example. The starter is disengaged after engine start as evidence, for example, by engine 10 reaching a predetermined speed after a predetermined time. Further, in the disclosed embodiments, an exhaust gas recirculation (EGR) system routes a desired portion of exhaust gas from exhaust manifold 48 to intake manifold 44 via an EGR valve (not shown). Alternatively, a portion of combustion gases may be retained in the combustion chambers by controlling exhaust valve timing.

The engine 10 operates in various modes, including lean operation, rich operation, and "near stoichiometric" operation. "Near stoichiometric" operation refers to oscillatory operation around the stoichiometric air fuel ratio. Typically, this oscillatory operation is governed by feedback from exhaust gas oxygen sensors. In this near stoichiometric operating mode, the engine is operated within approximately one air-fuel ratio of the stoichiometric air-fuel ratio. This oscillatory operation is typically on the order of 1 Hz, but can vary faster and slower than 1 Hz. Further, the amplitude of the oscillations are typically within 1 a/f ratio of stoichiometry, but can be greater than 1 a/f ratio under various operating conditions. Note that this oscillation does not have to be symmetrical in amplitude or time. Further note that an air-fuel bias can be included, where the bias is adjusted slightly lean, or rich, of stoichiometry (e.g., within 1 a/f ratio of stoichiometry). Also note that this bias and the lean and rich oscillations can be governed by an estimate of the amount of oxygen stored in upstream and/or downstream three way catalysts.

As described below, feedback air-fuel ratio control is used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) is adjusted based on a desired air-fuel ratio and the air-fuel ratio from the sensor. Further still, individual cylinder air-fuel ratio control could be used, if desired.

Also note that various methods can be used to maintain the desired torque such as, for example, adjusting ignition timing, throttle position, variable cam timing position, exhaust gas recirculation amount, and a number of cylinders carrying out combustion. Further, these variables can be individually adjusted for each cylinder to maintain cylinder balance among all the cylinder groups.

Figure 2:
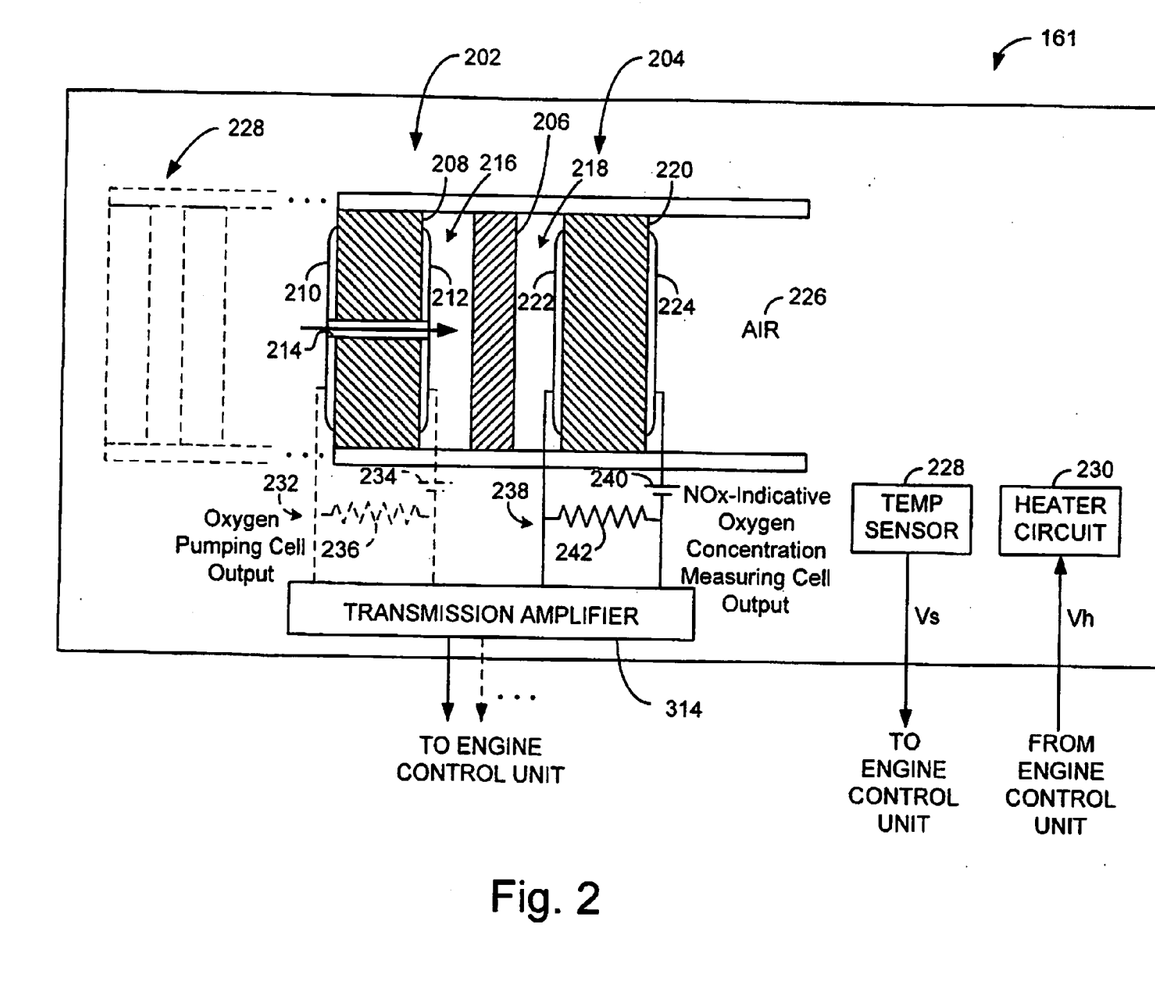
FIG. 2 is a detailed view of an example sensor structure.

A NOx Sensor 161 according to one exemplary embodiment is shown in FIG. 2. NOx Sensor 161 may include an oxygen pumping cell assembly 202 and a NOx concentration measuring cell assembly 204, which are separated by a diffusion barrier 206, or other barrier having an aperture, or combinations thereof. Further, as noted below, additional oxygen pumping cells, and/or cells for measuring other exhaust gas constituents may be added, and the NOx pumping cell may be deleted.

Oxygen pumping cell assembly 202 may include an oxygen pumping cell 208, manufactured of zirconia in one example, and an adjacent chamber 216. An exhaust gas passage 214 is formed through diffusion cell 208 to allow passage of exhaust gas into chamber 216. Exhaust gas passage 214 may be an opening, or thru-hole, extending through the diffusion cell. Alternatively, it will be appreciated that the exhaust gas passage 214 may be a diffusion barrier, formed of a diffuse material that allows exhaust gas to pass therethrough. Oxygen pumping cell 208 is configured to receive a drive current, or voltage. By applying the drive current to oxygen pumping cell 208, oxygen is substantially removed from the exhaust gas stream, to thereby prepare the exhaust gas for passage to the NOx concentration measuring cell assembly 204.

Electrodes 210 and 212 are provided on opposite sides of the oxygen pumping cell 208. The electrodes are configured for use in measuring a differential voltage, or pumping current, that is indicative of the difference in the oxygen concentration in the exhaust gas upstream of oxygen pumping cell 208 and the oxygen concentration in the exhaust gas in chamber 216, from which oxygen has been substantially removed by oxygen pumping cell 208. Under this condition, the pumping current saturates at a level proportional to the rate of oxygen diffusing into the chamber. The limiting current from the first cell is a measure of the oxygen concentration in the measurement gas and may thus be proportional to air/fuel ratio, and used as such for feedback air-fuel ratio control as described below herein.

After passing through the oxygen pumping cell assembly 208, the exhaust gas, now with substantially all oxygen removed, passes through diffusion barrier 206 into a chamber 218 of NOx concentration measuring cell assembly 204 for further processing and measurement. Note that there may be multiple oxygen pumping cells, as well as multiple NOx concentration measuring cells, as indicated at 250.

NOx concentration measuring cell assembly 204 further includes a NOx concentration measuring cell 220, formed of zirconia in one example. Upon application of a drive current to NOx concentration measuring cell 220, the cell may be configured to break down the NOx in the exhaust gas in chamber 218 into constituent oxygen and nitrogen parts. Electrodes 222 and 224 are provided on opposite sides of the NOx concentration measuring cell 220, to measure the difference in the concentration of oxygen in the exhaust gas within chamber 218, and reference air 226, obtained from the atmosphere in one example. The difference in oxygen concentrations is indicated by the electrical potential between the electrodes 222, 224. Since the oxygen in the exhaust gas stream is removed before entering chamber 218, any oxygen present in chamber 218 will be the result of the breakdown of NOx. Thus, the measured concentration of the oxygen in chamber 218 is indicative of the NOx concentration in the exhaust gas stream. For this reason, NOx concentration measuring cell 220 may alternatively be referred to as a NOx-indicative oxygen concentration measuring cell 220.

As discussed below, NOx Sensor 161 is further provided with transmission amplifier 314, which may be configured to amplify signals from the NOx sensor for transmission to the engine control unit. It will be appreciated that the voltage or current output from electrodes 222, 224 on the NOx concentration measuring cell 220 may be small, for example, on the order of nanoamps, and thus the signal integrity may suffer if transferred over long distances, such from a exhaust pipe mounted in the rear of a vehicle to a controller which may be remote from the exhaust, such as in an engine compartment (which may be in the front portion of a vehicle for forward mounted engines) or in another underbody, or chassis location. It will further be appreciated that an output signal of the oxygen pumping cell may also be amplified by transmission amplifier 314, for transmission to the control unit 12, such as an engine control unit, a transmission control unit, or a powertrain control unit, for example.

In one example, sensor 161 may include a housing, and the transmission amplifier and NOx sensor are both positioned within the housing. Alternatively, the transmission amplifier and NOx sensor may be provided with separate housings positioned adjacent each other.

Transmission amplifier 314 may be formed integrally with the NOx sensor 161, or directly attached to, or coupled to, the NOx sensor. Alternatively, the transmission amplifier may be located a short distance away from the NOx sensor, but typically not more than 0 to 50 centimeters (or, 0–10, 0–20, 0–30, 0–40 cm), to reduce undesirable signal degradation from the NOx concentration measuring cell output.

Intermediate circuits 232, 238 may be provided to send an appropriate output signal to transmission amplifier 314 from the electrodes 210, 212, and 222, 224, respectively. Each intermediate circuit 232, 238 may include a resistor 236, 242, and a voltage source 234, 240, as well as various other circuitries. The intermediate circuits 232, 238 may be suitably configured to output the oxygen pumping cell output signal and the NOx-indicative oxygen concentration measuring cell output signal, as a voltage signal, current signal, or other electrical signal suitable to indicate the measured phenomenon.

Transmission amplifier 314, in turn, is configured to amplify the signal received from electrodes 210, 212, and 222, 224, and transmit those signals to the engine control unit over a predetermined distance. The predetermined distance may be the distance between a rear exhaust pipe and a front engine compartment on a vehicle. By way of example, the transmission amplifier may be designed to transmit a signal for a distance that is over 0.5 meters, and is typically between 0.5 and 5 meters of wire length, although it may be outside this range. The transmission amplifier output signal may range between 0 to 5 volts and 1–2 milliamps, although other voltages and currents suitable for transmission over the specified distances alternatively may be used. In one example, a current amplifier may be used to take advantage of the substantially linear relationship between pumping current and NOx concentration.

In this way, a method for controlling NOx emissions may be practiced according to one embodiment. The method may include, at a NOx sensor, producing an output signal indicative of a NOx concentration in an exhaust gas. The following process may be used to produce the output signal: substantially removing oxygen from an exhaust gas to produce a substantially de-oxygenated exhaust gas, passing the substantially de-oxygenated exhaust gas through a diffusion barrier, breaking down NOx in the substantially de-oxygenated exhaust gas, to thereby produce constituent oxygen, and measuring the concentration of constituent oxygen generated from the breaking down of NOx, to thereby produce the output signal indicative of the NOx concentration in the exhaust gas. The method may further include, at the NOx sensor, amplifying the output signal for transmission to a remote engine control unit, and transmitting the amplified output signal to the remote engine control unit. The output signal prior to amplification is typically between about 0 and 100 nanoamps, and the output signal after amplification is typically between about 0 and 10 milliamps. In one example, the pumping current for the NOx output is about 0 to 5 microamps for about 0 to 1000 PPM NOx measurement. Alternatively, it will be appreciated that other currents suitable for transmission over the transmission distances may be used. Typically, the output signal is amplified sufficiently to transmit the signal a distance greater than 50 cm. According to one embodiment, the output signal is amplified sufficiently to transmit the signal a distance between about 10 cm and 5 meters (or 1–5 meters, 50 cm to 2 m, 10 cm to 1 m, or others).

Continuing with FIG. 2, NOx sensor 161 may also be provided with a temperature sensor 228 configured to read a temperature adjacent the NOx sensor and send a signal indicative of the temperature to the engine control unit. It will be appreciated that the output of the temperature sensor may also be routed through the transmission amplifier 314 for transmission to the engine control unit. Note that multiple sensors may be used, if desired.

NOx sensor 161 also may include a heater circuit, configured to receive control signals from the engine control unit, or another controller, and to drive heating elements provided at locations adjacent oxygen pumping cell assembly 202 and/or NOx concentration measuring cell assembly 204. The heater circuit, in combination with the temperature sensor, may be used to maintain desired temperatures adjacent the cell assemblies.

While this example illustrates providing an amplified signal for NOx, (or amplified signals for O2 and NOx), the sensor may be configures to measure various other exhaust gas constituents. For example, cell assembly 204 may be configured to measure any oxygen containing species, including SO2, H2O, CO, CO2, and the like. Or, additional cells may be added for any of the above constituents in addition to a NOx cell. Like NOx cell assembly 204, these other constituents may also produce low pumping current levels relative to the first cell, and thus may also be amplified via a transmission amplifier to enable processing in a remote electronic control unit.

As noted previously, in one example, sensor 161 can be an integrated NOx-UEGO (output proportional to oxygen concentration, and/or air-fuel ratio) sensor. As described above, this sensor may include a dual pumping cell type sensor. Typically, the pumping current from the first cell is large enough (on the order of milliamps) that the electronics to process the signal can be physically removed from the sensor, and incorporated into controller 12, for example. However, since 1) NOx concentrations are typically much lower than oxygen concentrations in the engine exhaust, and
2) NOx must diffuse through at least two separate diffusion barriers, the oxygen being pumped by the second cell from the dissociation of NOx may be very small. Therefore, the resulting limiting pumping current may also be very small (on the order of nanoamps), as compared to the milliamps arising from the first cell pump current. These small pumping currents may thus limit the distance between the signal processing electronics and the sensor, and may also require fairly sophisticated ammeters to accurately measure the signal.

Further, long signal wires between the sensor and the electronics may result in loss of signal and increased noise pickup. The farther the electronics are physically located away from the sensor, the larger the loss of the pumping current in the wire due to wire losses leading, which may lead to less accurate measurement of the NOx concentration. This may cause the NOx signal to be inaccurate.

While one approach may place the processing electronics for the NOx and UEGO signal in close proximity to the sensor (including a processor with A/D converters to process the signals and the heater controller for the sensor), such an approach may increase costs. Thus, in an alternative embodiment, the structural, composition, and/or material modifications may be used to enable the processing electronics for the NOx signal to be physically located farther away from the sensing location in the engine exhaust. For example, these modifications may be selected to increase the gas permitted to diffuse.

In other words, one factor determining how gas is permitted to diffuse into the sensor partially depends on the flux of oxygen that can be pumped out of the first cell, where the interfering species (oxygen) is removed (by pumping). If flux of gas into the first cell can be increased by a factor (e.g., 100), then the pump circuit still needs to pump out this oxygen and the pumping currents may therefore be increased by the same factor (100). However, there may be limits on the sensor current, such as approximately 4 mA in air. Thus, to increase the flux by 100 would require approximately 400 mA pumping current, which may be an upper limit for the amount of current that could reasonably be pumped through the electrodes, and the electrode area may need to be increased to handle the increased current (density). The second diffusion barrier between the first and second chambers could also be made more porous (or shorter in length) to increase the amount of NOx diffusing into the second chamber. The second diffusion barrier may also have a significantly smaller pore size than the first diffusion barrier since its behavior may be consistent with Knudsen diffusion. Therefore, it may be possible to change the diffusivity of this second diffusion barrier by at least a factor of, for example, 10 (either more porous or shorten the diffusion path, or combinations thereof) to gain a higher flux of NOx into the second chamber. In the limiting case, this second diffusion barrier may be entirely eliminated by the appropriate changes in geometry.

In other words, in a sensor such as describe above, the NOx sensor signal is of lower pumping current than the oxygen signal. Therefore, for example, the apertures or porous diffusion barriers (or combinations thereof) may be modified such that a larger amount of gas can diffuse into the chambers. In the case of an aperture, this may be accomplished by changing the geometry of the aperture, for example by increasing the diameter of the opening or shortening the diffusion path. In the case of a porous diffusion barrier, this may be accomplished by changing the structure of the barrier, i.e., making it more porous (larger pore size or more pores) or changing the geometry by shortening the diffusion path length or increasing the cross-sectional area of the diffusion path (or some combination thereof). These modifications to the diffusion barriers may also require additional changes to the first pumping cell to enable higher pumping currents necessary to remove the increased flux of oxygen. Further, they can increase the pumping current in the NOx cell, thus enabling the processing electronics to be incorporated into controller 12, along with the oxygen signal and heater control electronics.

In this way, reduced cost of the electronics for NOx-UEGO sensor processing is enabled since the already existing processing power and I/O capabilities of the controller 12 are exploited. Further, the electronics are packaged in controller 12 in a less damaging environment with reduced water splash, humidity, etc.

Figure 3:
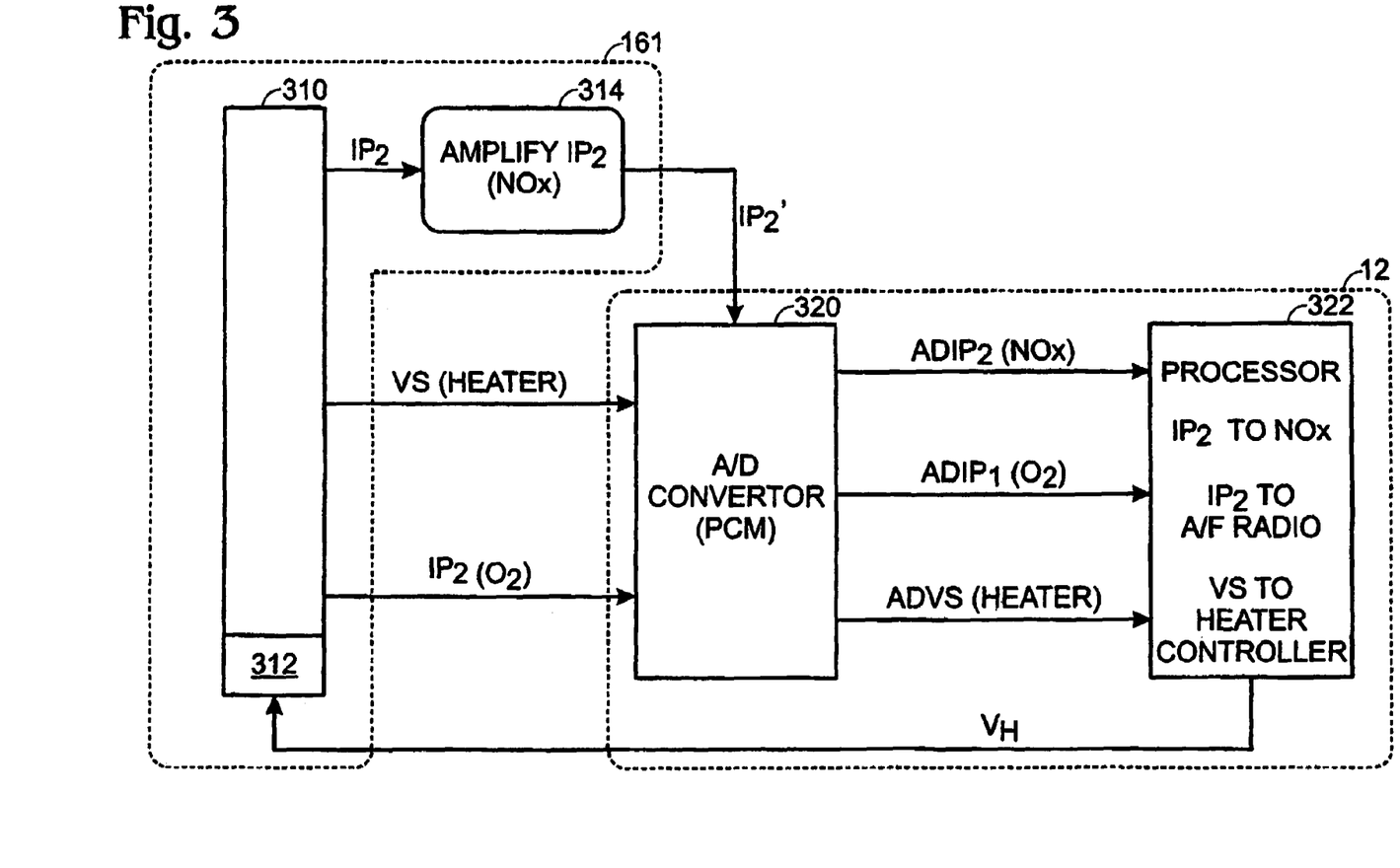
FIG. 3 is a schematic view of a NOx sensor and control system.

Referring now to FIG. 3, a schematic diagram shows sensor 161 and controller 12, including various internal signals and processors. Specifically, sensor 161 is schematically shown including the sensor cells 310 and heater 312. While in this example a single heater and associated heater controls are used, multiple heaters could be used in an alternative example. For example, a dedicated heater for each cell may be used. FIG. 3 also shows sensor signals, including VS representing a sensed heater voltage that may be used to estimate and/or control heater and sensor temperature, IP1 representing the first cell pump current representing oxygen, and IP2 representing the second cell pump current indicative of NOx. While not shown, various electronics may be incorporated into the sensor 310 for accurately generating and conditioning the pump currents.

In this example, an optional current transmission amplifier 314 is included to amplify the second cell pump current in close proximity to the sensor cell 310. In one example, the current amplifier is physically coupled to the sensor in the engine exhaust. Alternatively, it may be located separate from the cells 310. In this way, an amplified pump current IP2' is generated that can be transmitted over a distance (such as from the exhaust sensor location of sensor 161 to controller 12, which may be up to several feet away) is supplied to controller 12. In one example, the amplifier amplifies the NOx signal analog signal such that it can be transmitted over a distance to controller 12, which is located in another portion of the vehicle away from the engine exhaust.

The distance between the amplifier 314 and the controller 12 can be greater due to the amplified current signal being less susceptible to transmission loss and electromagnetic interference. Further, additional processing may not be required, since the processing power (such as A/D converters) of controller 12 may be synergistically used.

Transmission amplifier 314 may be of various forms, including an analog current amplifier. In yet another alternative embodiment, the amplifier can be a voltage amplifier, or other type of amplifier to amplify an analog output of the sensor, such as the signal indicative of NOx. While the amplifier may be an analog amplifier any type of amplifier may be used.

Each of the three example signals from sensor 161 may be fed to an A/D converter in controller 12. While this example shows a single A/D converter, multiple converters could be used. The digitally converted signals (ADIP2, ADIP1, and ADVS) are then supplied to the processor 322. The processor then may convert the digital A/D counts to representative units for the respective signals. Further, as described above and below herein, the processor performs various operations and controls to generate signals that are sent to engine actuators, as well as to the heater 312 and sensor 161.

Thus, in this way, it is not required to provide separate processing electronics, such as A/D converters, separate from the engine or powertrain control unit, and potentially in close proximity to the sensor in the exhaust gas. However, if desired, extra processing may be used.

In other words, in a sensor such as describe above, the NOx sensor signal is of lower pumping current than the oxygen signal (e.g., on the order of nanoamps compared with milliamps, in some examples). This small pumping current may thus limit the distance between the signal processing electronics and the NOx sensor signal, and may also require fairly sophisticated ammeters to accurately measure the signal.

Further, long signal wires between the sensor and the electronics may result in loss of signal and increased noise pickup. The farther the electronics are physically located away from the sensor, the larger the loss of the pumping current in the wire due to wire losses leading, which may lead to less accurate measurement of the NOx concentration. This may cause the NOx signal to be inaccurate.

While one approach may place the processing electronics for the NOx and UEGO signal in close proximity to the sensor (including a processor with A/D converters to process the signals and the heater controller for the sensor), such an approach may increase costs. Thus, since only the NOx sensor signal may be of low pumping current, in an alternative embodiment, some of the expensive oxygen signal processing electronics, NOx signal processing electronics, and heater control electronics are moved into the engine or powertrain control module (e.g., controller 12). In this way, the losses in the wiring may not significantly effect the accuracy of the NOx measurement, yet significant cost savings and synergistic operation may be achieved. Specifically, reduced cost of the electronics for NOx-UEGO sensor processing is enabled since the already existing processing power and I/O capabilities of the controller 12 are exploited. Further, some of the electronics are packaged in controller 12 in a less damaging environment with reduced water splash, humidity, etc.

Referring now to FIG. 4, an example second emission control device 72 is shown in further detail. While FIG. 4 refers to device 72, the example(s) may apply to any emission control device in the exhaust, such as devices 70 and/or 72. In FIG. 4, device 72, which in this example is a single can, may contain multiple catalyst bricks (72A, 72B, and so on up to 72Y and 72Z). Alternatively, device 72 may refer to a combination of cans, each containing a single, or multiple, catalyst brick(s). In yet another example, device 72 can contain just one, two, or three bricks. Additionally, various types of catalytic converters can be used, such a three-way catalytic washcoats. For example, three way catalysts that absorb NOx when engine 10 is operating lean of stoichiometry can be used that contain materials such as barium and/or other such elements. In such catalysts, the absorbed NOx is subsequently reacted with rich exhaust gas constituents (HC and CO, for example) and catalyzed during a NOx purge cycle when controller 12 causes engine 10 to operate in either a rich mode or a near stoichiometric mode, and may be referred to as NOx absorbers, NOx adsorbers, and/or NOx traps. Further, the catalyst can be on various types of substrates, including particulate filters.

Figure 4A:
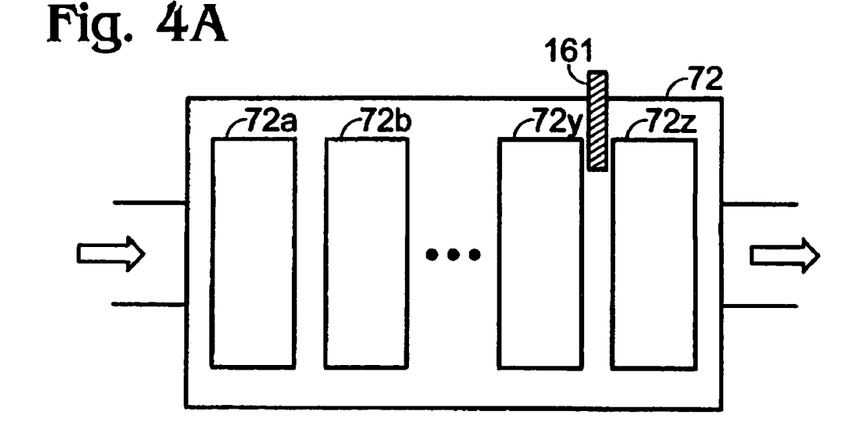
FIG. 4 is a schematic view showing alternative sensor locations.
Figure 4B:
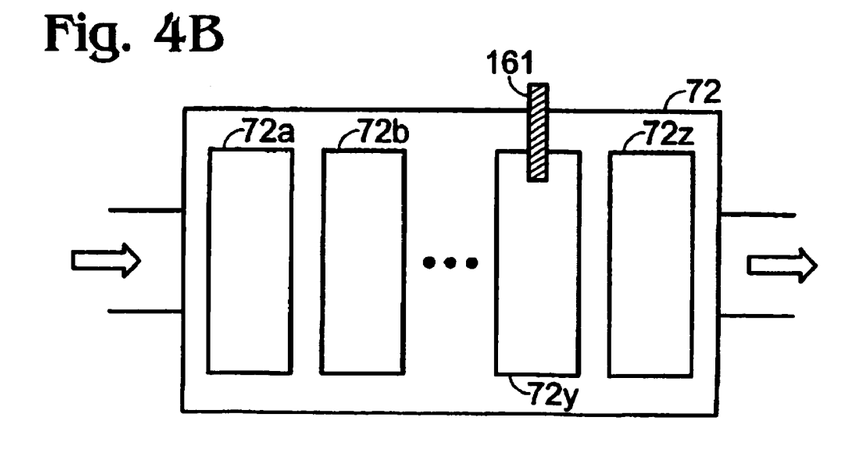

As shown in FIG. 4, sensor 161 can be placed in various locations, such as between two bricks as in FIG. 4A, or within a brick, as in FIG. 4B.

Further details of control routines are included below which can be used with various engine configurations, such as those described in FIG. 5. As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the disclosure, but is provided for ease of illustration and description. Although not explicitly illustrated, one of ordinary skill in the art will recognize that one or more of the illustrated acts or functions may be repeatedly performed depending on the particular strategy being used. Further, these figures graphically represent code to be programmed into the computer readable storage medium in controller 12.

Figure 5:
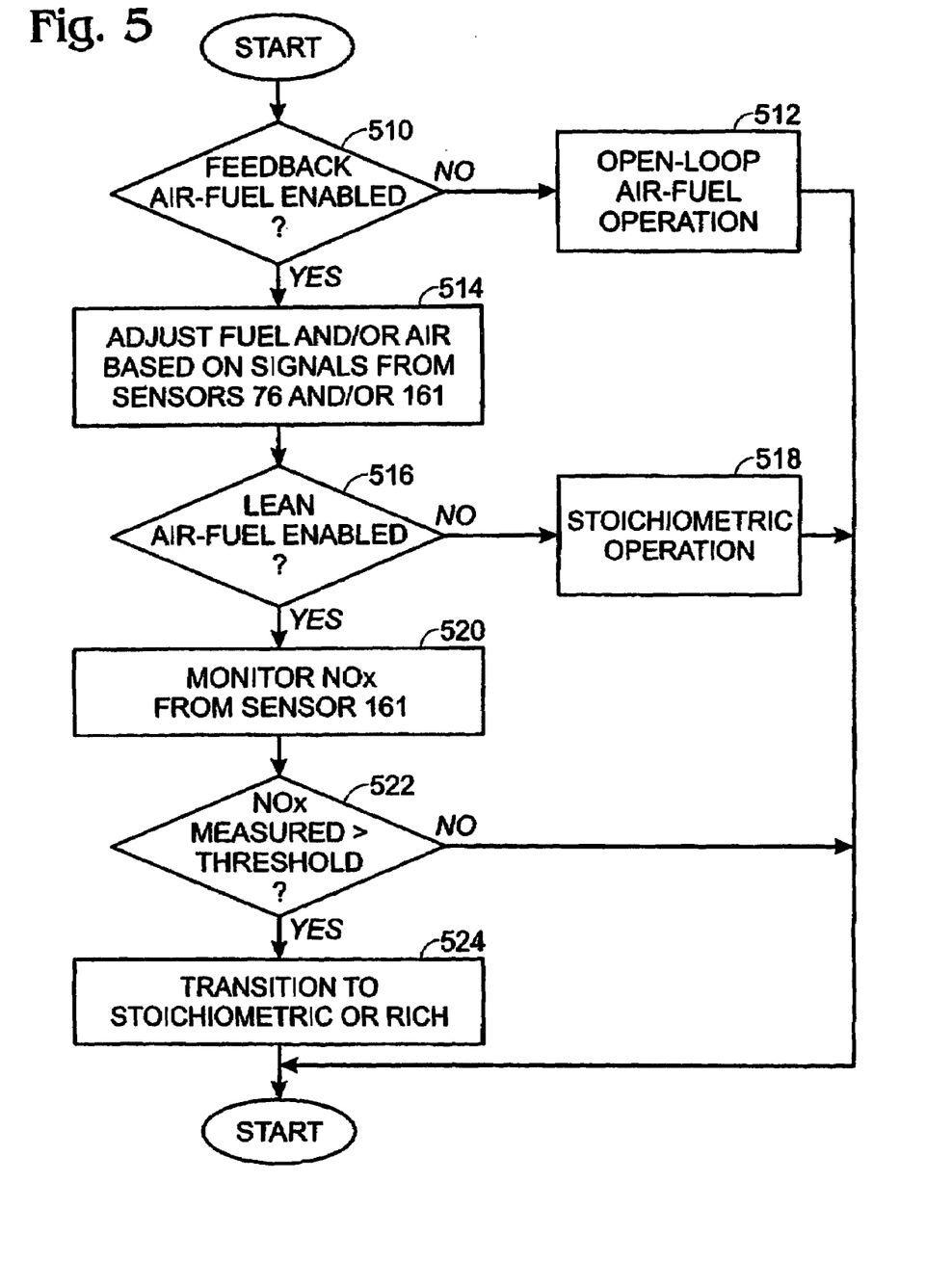
FIG. 5 is a flow chart of a routine for controlling engine operation using a NOx sensor.

Referring now to FIG. 5, a routine is described for controlling engine actuators based on the output(s) from sensor 161, as well as various other parameters. First, in step 510, the routine determines whether feedback air-fuel ratio is enabled. This determination can be determined based on various parameters such as exhaust gas temperature, engine temperature, time since engine start, requested torque and/or other parameters. When the answer to step 510 is no, the routine continues to step 512 to operate with open-loop air-fuel operation, where injected fuel is delivered in proportional to inducted airflow without feedback from one or both of sensors 76 and 161.

Alternatively, when the answer to step 510 is yes, the routine continues to step 514 to adjust injected fuel and/or inducted air based on signals from sensors 76 and/or 161. In one example, the routine adjusts the injected fuel to maintain a desired air-fuel ratio about the stoichiometric value, which may include oscillations about the stoichiometric or desired air-fuel ratio. Alternatively, the routine can adjust the electronically controlled throttle plate 62 to control engine air-fuel ratio. Also, the desired air-fuel ratio value can be determined based on various operating conditions, including the NOx signal $IP_2$ from sensor 161. Further, feedback air-fuel ratio may be controlled by proportional or integral control based on an error between desired and measured air-fuel ratio values. Specifically, feedback from the oxygen output ($IP_1$) from sensor 161 may be compared to desired exhaust air-fuel ratio to adjust injected fuel or inducted air.

Continuing with FIG. 5, in step 516, the routine determines whether lean air-fuel ratio is enabled. If the answer to step 516 is no, the routine continues to step 518 to perform stoichiometric air-fuel ratio operation where the desired air-fuel ratio is set about the stoichiometric value. Alternatively, when the step to 516 is yes, the routine continues to step 520 which includes lean engine operation where the desired engine air-fuel ratio is set lean of stoichiometry, and in some examples leaner than approximately 18:1.

In step 520, the routine monitors the NOx output from sensor 161 and in step 522 compares the measured NOx value to a threshold value. In one example, the NOx threshold can be adjusted based on various vehicle and/or engine operating conditions, including temperature, time since engine start, humidity, and/or various other values. Further, the measured NOx can be calculated on a grams/mile basis and compared to a grams/mile threshold. Furthermore, the NOx can be determined on a parts/million (PPM) value compared to a parts/million threshold.

When the answer to step 522 is no, the routine continues to the return block. Alternatively, when the answer to step 522 is yes, the routine continues to step 524 to transition the engine to operate in stoichiometric engine or rich conditions to purge stored oxidants from the engine exhaust. This temporary rich and/or stoichiometric operation may be performed for a fixed period, or may be terminated based on the output from the oxygen signal ($IP_1$) from sensor 161. Once the transition operation is completed, the engine returns to lean operation.

The adjustment based on signals $IP_1$ and/or $IP_2$ from sensor 161 may thus include adjusting fuel injection amounts of the fuel injector or electronically controlled throttle plate. Further it may also include: adjusting a fuel injection timing of the fuel injector, adjusting a variable cam timing actuator; adjusting ignition timing; adjusting air-fuel ratio; adjusting an EGR amount; and/or adjusting reductant injection in the engine exhaust.

In addition to the control routine above, various other operations may be included. For example, degradation detection may be used to determine operability of sensor 161. In one example, degradation of the current amplifier may be performed to discriminate between the degradation of the sensor electronics in controller 12 and degradation of the current amplifier. If the current amplifier degrades, this may only affect the NOx signal (IP2), and thus the oxygen signal (IP1) may still be used in default operation. Alternatively, if the heater controller degrades, both NOx signal (IP2) and oxygen signal (IP1) can be determined to be degraded and thus default operation independent of sensor 161 may be taken (e.g., feedback control based on sensor 76 and independent of sensor 161). Alternative diagnostic approaches may also be used. For example, if the first cell of sensor 161 is detected to have degraded, the controller may determine that the second cell will also be degraded, as the NOx reading may be affected by errors in the first cell. However, the converse may not be true. Rather, if the NOx signal is detected to have degraded, the oxygen signal may still be used for feedback air-fuel ratio control, for example.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various system and exhaust configurations, fuel vapor purging estimate algorithms, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A system for a vehicle having an internal combustion engine, the system comprising:
    a sensor adapted to be coupled into an exhaust of the engine, said sensor outputting at least a first signal indicative of oxygen and a second signal indicative of NOx;
    a controller receiving at least said first and second signals directly from the sensor, said controller processing said first and second signal, and controlling said engine by adjusting an engine actuator based on at least one of said first and second processed signals, wherein said controller adjusts said actuator by sending a control signal directly from the controller to the actuator; and
    a transmission amplifier coupled to said sensor configured to amplify said second signal such that it can be transmitted directly to and received by said controller positioned a predetermined distance away from said exhaust.

2. The system of claim 1 wherein said sensor further comprises a heater, said sensor further outputting a third signal received by said controller, said controller further processing said third signal and controlling said heater based on said third processed signal.

3. The system of claim 2 wherein said engine actuator comprises a fuel injector.

4. The system of claim 3 wherein said controller adjusts a fuel injection amount of said fuel injector.

5. The system of claim 3 wherein said controller adjusts a fuel injection timing of said fuel injector.

6. The system of claim 3 where said fuel injector directly injects fuel into a combustion chamber of the engine.

7. The system of claim 2 wherein said predetermined distance is at least about 0.5 meters away from said sensor.

8. The system of claim 2 wherein said engine actuator comprises an electronically controlled throttle plate.

9. The system of claim 2 wherein said engine actuator comprises a variable cam timing actuator.

10. The system of claim 2 wherein said engine actuator comprises a spark plug.

11. The system of claim 2 wherein said controller controls an engine air-fuel ratio to a desired value in response to said first signal.

12. The system of claim 2 wherein said engine actuator comprises an exhaust gas reductant injector.

13. The system of claim 8 wherein said controller changes said engine air-fuel ratio from lean to stoichiometric or rich in response to said second signal.

14. The system of claim 1 wherein said sensor is adapted to be coupled into said exhaust of the engine downstream of a catalyst.

15. The system of claim 1 wherein said sensor is adapted to be coupled into said exhaust of the engine within a catalyst.

16. The system of claim 14 wherein said catalyst comprises a NOx trap.

17. The system of claim 15 wherein said catalyst comprises a NOx trap.

18. The system of claim 14 wherein said catalyst comprises a selective catalyst reduction catalyst.

19. The system of claim 15 wherein said catalyst comprises a selective catalyst reduction catalyst.

20. The system of claim 1 wherein said controller receives from a distance at least about 0.5 meters said second signal as an analog signal.

21. A system for a vehicle having an internal combustion engine, the system comprising:
    a sensor adapted to be coupled into an exhaust of the engine, said sensor outputting at least a first signal indicative of oxygen and a second analog signal indicative of NOx;
    a controller receiving at least said first and second signals directly from the sensor, said controller processing said first and second signal and converting at least said second signal in an analog to digital converter, and controlling said engine by controlling an engine actuator based on at least one of said first and second processed signals, wherein said controller adjusts said actuator by sending a control signal directly from the controller to the actuator; and
    a transmission amplifier coupled to said sensor to amplify said second analog signal before it is transmitted to and received by said controller, said transmission amplifier amplifying said second analog signal such that it can be transmitted over a distance to said controller located in another portion of the vehicle away from said engine exhaust.

22. A system for a vehicle having an internal combustion engine, the system comprising:
    a sensor adapted to be coupled into an exhaust of the engine, where exhaust gas enters at least a first pumping cell that outputs at least a first signal indicative of oxygen, and then enters a second pumping cell through a passage, the second cell outputs at least a second signal indicative of NOx, and the passage configured to produce said second signal such that it can be amplified by an amplifier enough to overcome transmission losses over a distance of at least about 0.5 meters to a controller;
    said controller receiving at least said first and second signal, said controller processing said first and second signal, and controlling said engine by adjusting an engine actuator based on at least one of said first and second processed signals.

23. The system of claim 22 wherein said passage is an aperture, said aperture large enough such that said second signal can be transmitted to a controller.

24. The system of claim 22 wherein said passage is a diffusion barrier, said diffusion barrier of porosity and thickness small enough such that said second signal can be transmitted to a controller.

25. The system of claim 22 further comprising a transmission amplifier for said second signal.

26. A system for a vehicle having an internal combustion engine, the system comprising:
    a sensor adapted to be coupled into an exhaust of the engine, said sensor outputting at least a first signal indicative of oxygen and a second signal indicative of an exhaust gas constituent having an oxygen-containing species;
    a controller receiving at least said first and second signal, said controller processing said first and second signal, and controlling said engine by adjusting an engine actuator based on at least one of said first and second processed signals, wherein said controller adjusts said actuator by sending a control signal directly from the controller to the actuator; and a transmission amplifier coupled to said sensor configured to amplify said second signal enough to be transmitted away from said exhaust to said controller.

27. A NOx sensor system for a vehicle having an exhaust passage, the system comprising:
an engine control unit positioned at least about 0.5 meters remote from the exhaust passage; and
a NOx sensor fluidly connected to the exhaust passage of the vehicle, the NOx sensor including:
a NOx concentration measuring cell configured to produce an output signal indicative of a NOx concentration in an exhaust gas stream of the exhaust passage; and
a transmission amplifier configured to receive the output signal from the NOx concentration measuring cell and amplify the signal sufficiently to overcome transmission losses during transmission to the remote engine control unit.

28. The sensor system of claim 27, wherein the NOx sensor includes a housing and the transmission amplifier and NOx sensor are both positioned within the housing.

29. The sensor system of claim 27, wherein the transmission amplifier is positioned adjacent the NOx concentration measuring cell.

30. The sensor system of claim 27, wherein the NOx output signal produced by the NOx concentration measuring cell is between about 0 to 5 microamps for about 0 to 1000 PPM NOx measurement, prior to amplification by the transmission amplifier.

31. The sensor system of claim 27, wherein the NOx sensor further includes an oxygen pumping cell positioned upstream of the NOx concentration measuring cell.

32. The sensor system of claim 31, wherein the oxygen pumping cell is configured to produce an output signal, and wherein the transmission amplifier is configured to amplify the output signal sufficiently for transmission to the remote engine control unit.

33. A method for controlling NOx emissions, comprising:
at a NOx sensor, producing an output signal indicative of a NOx concentration in an exhaust gas; and
at the NOx sensor, amplifying the output signal for transmission to a remote engine control unit, wherein the output signal is amplified sufficiently to transmit the signal a distance at least about 0.5 meters.

34. The method of claim 33, further comprising:
substantially removing oxygen from an exhaust gas to produce a substantially de-oxygenated exhaust gas; and
passing the substantially de-oxygenated exhaust gas through a diffusion barrier.

* * * * *